US008817046B2

(12) United States Patent
Sugden et al.

(10) Patent No.: US 8,817,046 B2
(45) Date of Patent: Aug. 26, 2014

(54) COLOR CHANNELS AND OPTICAL MARKERS

(75) Inventors: Benjamin J. Sugden, Guildford (GB); Thomas G. Salter, Guildford (GB)

(73) Assignee: Microsoft Corporation, Redmond, WA (US)

( * ) Notice: Subject to any disclaimer, the term of this patent is extended or adjusted under 35 U.S.C. 154(b) by 530 days.

(21) Appl. No.: 13/091,575

(22) Filed: Apr. 21, 2011

(65) Prior Publication Data

US 2012/0268491 A1 Oct. 25, 2012

(51) Int. Cl.
*G09G 5/00* (2006.01)
*G06T 13/80* (2011.01)

(52) U.S. Cl.
CPC .................................... *G06T 13/80* (2013.01)
USPC ............................ 345/633; 345/613; 345/614

(58) Field of Classification Search
CPC combination set(s) only.
See application file for complete search history.

(56) References Cited

U.S. PATENT DOCUMENTS

| | | | |
|---|---|---|---|
| 7,515,756 B2 | 4/2009 | Hashimoto | |
| 2002/0140709 A1* | 10/2002 | Sauer et al. | 345/633 |
| 2003/0156144 A1 | 8/2003 | Morita | |
| 2006/0152434 A1* | 7/2006 | Sauer et al. | 345/8 |
| 2007/0291047 A1* | 12/2007 | Harville et al. | 345/589 |
| 2008/0074424 A1 | 3/2008 | Carignano | |
| 2009/0141973 A1 | 6/2009 | Wallack et al. | |
| 2009/0147991 A1 | 6/2009 | Chau | |
| 2010/0092079 A1 | 4/2010 | Aller | |
| 2011/0057878 A1* | 3/2011 | Moore et al. | 345/157 |

FOREIGN PATENT DOCUMENTS

KR 1020110004940 A 1/2011

OTHER PUBLICATIONS

Mohan, et al., "Bokode: Imperceptible Visual tags for Camera Based Interaction from a Distance", Retrieved at <<http://web.media.mit.edu/~ankit/bokode/bokode_sig09.pdf>>, Special Interest Group on Computer Graphics and Interactive Techniques Conference, Aug. 3-7, 2009, pp. 8.
Kruijff, et al., "Perceptual Issues in Augmented Reality Revisited", Retrieved at <<http://ieeexplore.ieee.org/stamp/stamp.jsp?tp=&arnumber=5643530>>, In Proceedings of the 9th IEEE and ACM International Symposium on Mixed and Augmented Reality (ISMAR), Oct. 13-16, 2010, pp. 3-12.
Tateno, et al., "A Nested Marker for Augmented Reality", Retrieved at <<http://ieeexplore.ieee.org/stamp/stamp.jsp?tp=&arnumber=4161037>>, IEEE Virtual Reality Conference, Mar. 10-14, 2007, pp. 259-262.
Acqua, et al., "Colored Visual Tags: a Robust Approach for Augmented Reality", Retrieved at <<http://ieeexplore.ieee.org/stamp/stamp.jsp?tp=&arnumber=1577306>>, IEEE International Conference on Video and Signal Based Surveillance (AVSS), Sep. 15-16, 2005, pp. 423-427.
"International Search Report", Mailed Date: Nov. 5, 2012, Application No. PCT/US2012/034597, Filed Date: Apr. 21, 2012, pp. 8.

* cited by examiner

*Primary Examiner* — Kee M Tung
*Assistant Examiner* — Leon T Cain, II
(74) *Attorney, Agent, or Firm* — Judy Yee; Micky Minahs

(57) ABSTRACT

Color channel optical marker techniques are described. In one or more implementations, a plurality of color channels obtained from a camera are examined, each of the color channels depicting an optical marker having a different scale than another optical maker depicted in another one of the color channels. At least one optical marker is identified in a respective one of the plurality of color channels and an optical basis is computed using the identified optical marker usable to describe at least a position or orientation of a part of the computing device.

20 Claims, 5 Drawing Sheets

COLOR CHANNELS AND OPTICAL MARKERS

BACKGROUND

Display techniques utilized by computing devices are ever evolving. For example, initial computing devices were provided with monochrome monitors. A user interacted with the computing device by viewing simple text on the monochrome monitor and entering text via a keyboard that could then be viewed on the monitor.

Display techniques were then expanded into use of color and graphical user interfaces. These techniques, for instance, may be utilized to show graphics to represent files, devices connected to the computing device, images, and so on using color. A user may then interact with the graphical user interface using the keyboard as well as by using a cursor control device, such as a mouse.

Display techniques have continued to evolve, such as through the use of glasses to view a three-dimensional television, use of virtual technology, and so on. However, complexities may arise in implementation of these techniques that may make the techniques difficult to implement by traditional computing devices.

SUMMARY

Color channel optical marker techniques are described. In one or more implementations, a plurality of color channels obtained from a camera are examined, each of the color channels depicting an optical marker having a different scale than another optical maker depicted in another one of the color channels. At least one optical marker is identified in a respective one of the plurality of color channels and an optical basis is computed using the identified optical marker usable to describe at least a position or orientation of a part of the computing device.

In one or more implementations, an apparatus includes a first optical tag that is resolvable at a first distance by a camera of a computing device and depicted using a first color and a second optical tag that is resolvable at a second distance at which the first optical tag is not resolvable by the camera of the computing device, the second optical tag depicted using a second color that is different that the first color.

In one or more implementations, an apparatus includes a camera, a display device, and one or more modules. The one or more modules are configured to obtain a first image from a red channel of the camera, a second image from a green channel of the camera, and a third image from a blue channel of the camera. The one or more modules are also configured to identify which of the first, second, or third images depict an optical marker that is resolvable by the one or more modules to determine a position or orientation of at least a part of the apparatus, compute a basis that describes the position or orientation of at least the part of the apparatus, and generate an augmented-reality display to be displayed by the display device using the computed basis.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Figure 1:
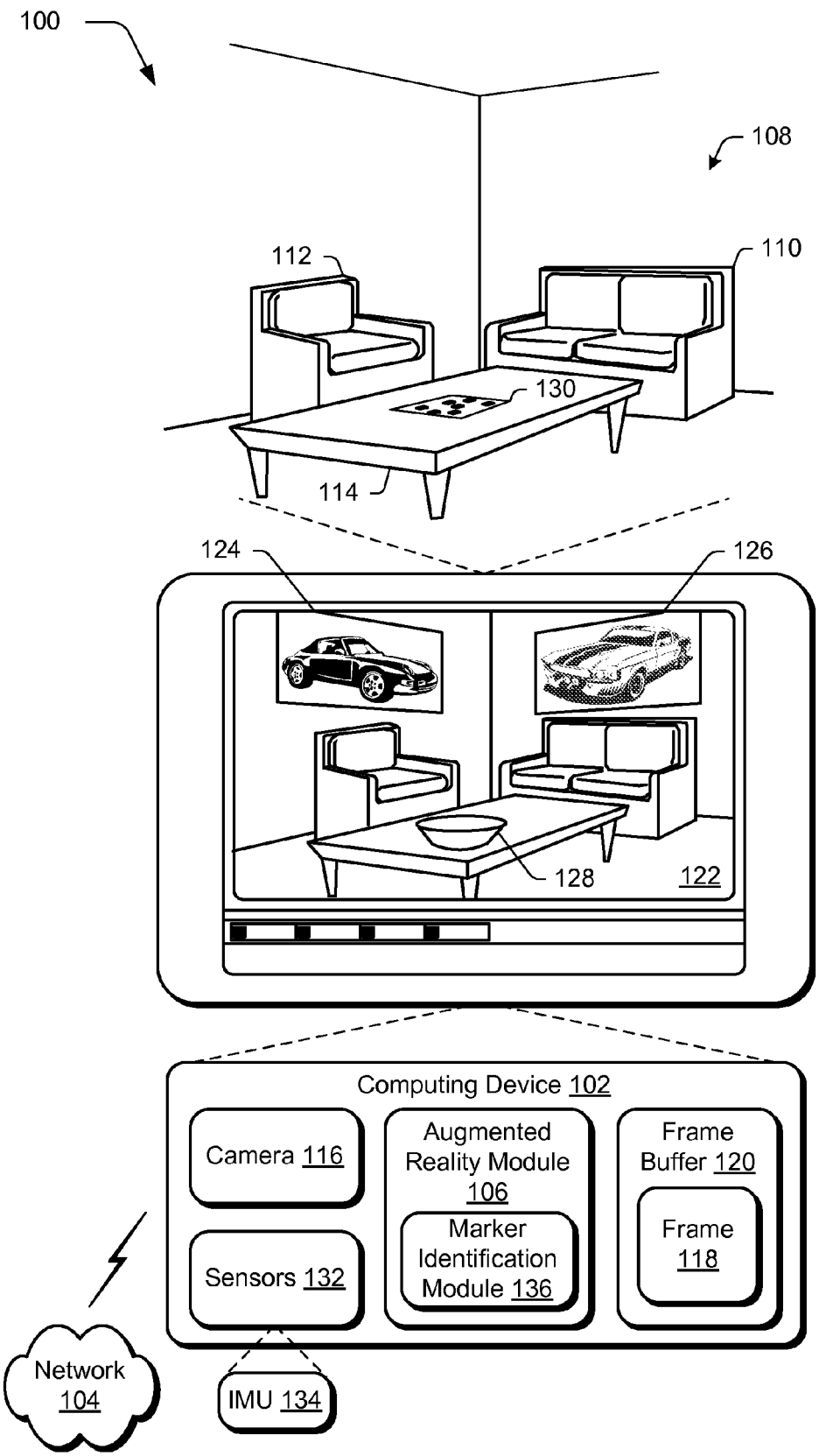
FIG. 1 is an illustration of an environment in an example implementation that is operable to employ augmented reality techniques described herein.

Augmented reality techniques are described in examples herein. Augmented reality techniques may be utilized to generate a view of a real world environment that is augmented using computer-generated outputs, such as sound or graphics. In this way, a user's view of the real world may include sensory inputs that were generated by a computing device and thus may augment a user's experience.

In the following discussion, augmented reality techniques are described that involve use of optical markers and color channels. For example, a camera may be utilized to capture an image of a physical environment of a computing device, such as a user's media room. The image may then be analyzed to locate markers that give an indication of a position and/or orientation of the camera in relation to the physical environment. Augmented-reality tags (AR tags), for instance, may be used to indicate a distance between the camera and the tags as well as an orientation in relation to the tags. In this way, the image may serve to compute an optical basis for determining the orientation and/or position of the camera in the physical environment.

However, traditional AR tags had a fairly limited range at which the tags were resolvable by a camera. For example, the camera may have a given resolution and traditional AR tags were typically formed at a single scale such that the tags were resolvable by the camera at a limited range of distances between the camera and the AR tags. Thus, designers were conventionally forced to determine a typical operating range of the camera and the AR tags, which could limit usefulness of the techniques at other ranges for which the AR tags and the computing device were not designed.

Accordingly, techniques are described herein in which multiple AR tags may be overlaid. Further, these tags may employ different scales and colors to correspond to color channels resolvable by a computing device. The computing device, for instance, may include a camera that supports red, green, and blue channels. The AR tags having these colors may be overlaid as a composite AR tag that supports different scales that correspond to these colors. For example, a large scale AR tag may be colored red, a medium scale AR tag may be colored green and overlaid over the red AR tag. Likewise, a small scale AR tag may be colored blue and also overlaid with the red and green AR tags. The camera may then capture images of the composite tag and use separate red, green, and blue channels to resolve one or more of the large, medium, or small tags. In this way, an effective range of the AR tag usage by the computing device may be tripled using these different ranges without expanding an overall size of the composite tag. Naturally, other color examples and optical marker techniques are contemplated, further discussion of which may be found in relation to the following sections.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to employ augmented reality techniques described herein. The illustrated environment 100 includes a computing device 102, which may be configured in a variety of ways. For example, although the computing device 102 is illustrated as a mobile communication device (e.g., tablet, wireless telephone), the computing device 102 may be configured in a variety of other ways. For instance, the computing device 102 may be configured as a computer that is capable of communicating over a network 104, such as a desktop computer, a mobile station, an entertainment appliance, a set-top box communicatively coupled to a display device, a game console, a tablet, and so forth.

Accordingly, the computing device 102 may range from full resource devices with substantial memory and processor resources (e.g., personal computers, game consoles) to low-resource devices with limited memory and/or processing resources (e.g., traditional set-top boxes, hand-held game consoles). Additionally, although a single computing device 102 is shown, the computing device 102 may be representative of a plurality of different devices, such as a user-wearable helmet and game console, multiple servers utilized by a business to perform operations that provide a platform "in the cloud," a remote control and set-top box combination, and so on.

The computing device 102 is also illustrated as including an augmented reality module 106. The augmented reality module 106 is representative of functionality of the computing device 102 to augment a view of real-world surroundings of the computing device 102. In the illustrated example, for instance, the computing device 102 is illustrated as being physically present in a room 108 that has a couch 110, a chair 112, and a table 114 that are positioned in a corner of the room 108.

The computing device 102 includes a camera 116 that is configured to capture one or more images of the physical surroundings of the computing device 102, e.g., the room 108 in this example. These one or more images may be used to capture a view of the "reality" that is to be augmented, although other input devices are also contemplated such as microphones. The augmented reality module 106 may receive data from the camera 116 (e.g., the one or more images) to generate a frame 118, which is illustrated as being stored in a frame buffer 120 of the computing device 102.

The frame 118 may then be displayed by a display device 122 of the computing device 102, which although illustrated as part of a mobile communication device may assume a variety of configurations. In one or more implementations, the display device 122 may be included as part of a helmet and positioned for viewing by one or more of a user's eyes. Additionally, the display device 122 may or may not be partially transparent. For example, the display device 122 may be configured to display both the image captured by the camera 116 along with augmentations. In another example, the display device 122 may be configured to display the augmentations without the view of the image captured by the camera 116, but permit a view of the physical surroundings to be seen through at least a portion of the display device 122. Thus, the augmentation generated by the augmented reality module 106 may be displayed in a variety of ways.

In the illustrated example, the frame 118 displayed by the display device 122 includes an image captured by the camera 116. The frame 118 also includes a plurality of augmentations that were generated by the augmented reality module 106. Illustrated examples displayed by the display device 122 include first and second pictures 124, 126 that appear positioned on walls of the room 108 as well as a bowl 128 that appears to be placed on the table 114. Thus, the augmented reality module 106 may augment the view of reality displayed by the display device 122. It should be readily apparent that augmentations generated by the augmented reality module 106 may assume a variety of other forms, such as objects as part of a game and other changes to a view of the surroundings of a computing device 102.

To generate this view and know "where" to place to augmentations, the augmented reality module 106 may leverage a variety of techniques to determine an orientation and/or position of the computing device 102 in relation to the environment, e.g., the room 108 as illustrated. For example, the augmented reality module 106 may leverage one or more optical markers to determine how the computing device 102 is positioned, oriented, moved, and so on. These optical markers may take a variety of forms. For instance, the augmented reality module 106 may set one or more view points in the living room as markers and thus serve as a basis to determine orientation and/or positioning, such as a corner of the table 114, orientation of the chair 112, and so on. Thus, the items in the room may act as a basis to determine where the computing device 102 is located within the room 108.

In another instance, the augmented reality module 106 may leverage a view of one or more augmented reality (AR) tags that are physically positioned within the surrounding environment of the computing device 102. An example AR tag 130 is illustrated as positioned on the table 114 in the room 108. Although a single AR tag 130 is shown, a plurality of AR tags may be utilized in the environment. The example AR tag 130 (or other markers) may be used as a basis to determine depth (e.g., distance between the AR tag 130 and the camera 116), three-dimensional orientation of the computing device 102 with respect to the AR tag 130, and so forth.

For example, the AR tag 130 may include a pattern that may be recognized by the augmented reality module 106 to determine a distance from the AR tag 130 and/or an orientation of the computing device 102 in relation to the AR tag 130. In this way, markers may be leveraged by the augmented reality module 106 to determine "where" and "how" the computing device 102 is positioned in a physical environment. The augmented reality module 106 may use this determination as a basis to generate augmentations to be output for viewing by a user of the computing device 102.

The augmented reality module 106 may also leverage one or more sensors 132 to determine and verify a position and/or orientation of the computing device 102. For example, the sensors 132 may be configured as an inertial measurement unit (IMU), which may include a gyroscope, one or more accelerometers, a magnetometer, and so on including any combination thereof. These units may be used to generate an external basis with which to verify a basis generated using the optical marking techniques previously described. For example, a basis generated using the optical marking techniques described above that leverages the camera 116 may be evaluated for discrepancies using a basis generated by the one or more sensors, e.g., an IMU 134. In this way, the techniques may be used to determine an orientation and position of the computing device 102 in relation to its physical surroundings.

The augmented-reality module 106 is further illustrated as including a marker identification module 136. The marker identification module 136 is representative of functionality to employ color channel techniques with optical markers such as the AR tag 130. For example, the marker identification module 136 may receive a feed from the camera 116 having multiple channels, each in a different color. Different scales of the AR tag 130 may be supported by coloring the AR tag 130 according to the color channels supported by the camera 116. In this way, an effective range of optical marker techniques may be extended by leveraging different scales and different colors, further discussion of which may be found in relation to FIG. 2.

Generally, any of the functions described herein can be implemented using software, firmware, hardware (e.g., fixed logic circuitry), manual processing, or a combination of these implementations. The terms "module" and "functionality" as used herein generally represent hardware, software, firmware, or a combination thereof. In the case of a software implementation, the module, functionality, or logic represents instructions and hardware that performs operations specified by the hardware, e.g., one or more processors and/or functional blocks.

For example, the computing device 102 may include an entity (e.g., software) that causes hardware of the computing device 102 to perform operations, e.g., processors, functional blocks, and so on. The computing device 102 may include a computer-readable medium that may be configured to maintain instructions that cause the computing device, and more particularly hardware of the computing device 102 to perform operations. Thus, the instructions function to configure the hardware to perform the operations and in this way result in transformation of the hardware to perform functions. The instructions may be provided by the computer-readable medium to the computing device 102 through a variety of different configurations.

One such configuration of a computer-readable medium is signal bearing medium and thus is configured to transmit the instructions (e.g., as a carrier wave) to the hardware of the computing device, such as via the network 104. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions and other data.

Figure 2:
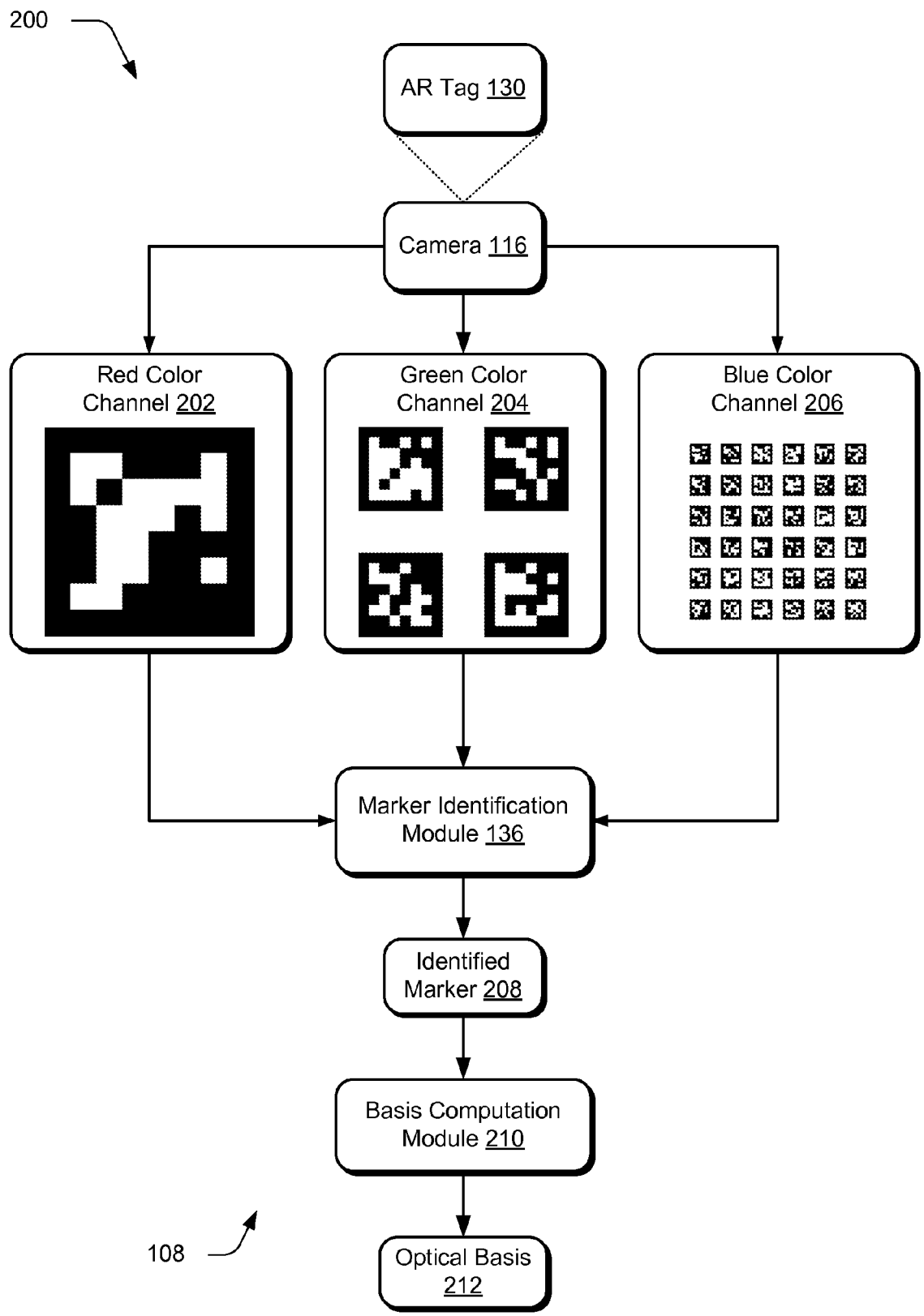
FIG. 2 is an illustration of a system in an example implementation showing an augmented reality module of FIG. 1 in greater detail as being employed for basis generation for a computing device.

FIG. 2 is an illustration of a system 200 in an example implementation showing the augmented reality module 106 of FIG. 1 in greater detail as being employed for basis generation for the computing device 102 that leverages a plurality of different color channels. A camera 116 in this example is illustrated as capturing images of an AR tag 130.

The images are illustrated as being separated into a plurality of different color channels, examples of which include a red color channel 202, a green color channel 204, and a blue color channel 206. Each of the channels is illustrated as including an image of the marker that corresponds to a color of the respective channel. For example, the red color channel 202 includes an image of a red AR tag at a relatively large scale and thus is configured to be viewable at a relatively large distance between the camera 116 and the AR tag 130. The green color channel 204, however, includes an image of a green AR tag that assumes a relatively medium scale in comparison to the large scale of the red AR tag and thus is configured to be viewable at a relatively medium distance between the camera and the AR tag 130. Likewise, the blue color channel 206 includes an image of a blue AR tag that assumes a relatively small scale and thus is configured to be viewable at a relatively close distance between the camera 116 and the AR tag 130. In this way, each of the color channels may relate to a particular range of distances that may different (e.g., entirely or partially) between the camera 116 and the AR tag 130 using a single resolution of the camera 116.

The marker identification module 136 may then compare the red, green, and blue color channels 206 to locate one or more images that are resolvable to determine a position or orientation of a part of the computing device 102, e.g., a part that includes the camera 116. For example, the camera 116 may be located at a distance at which AR tags in images taken from the red and green color channels 202, 204 are resolvable but AR tags includes in the blue color channel 206 are not.

In this example, the marker identification module 136 may leverage one or more of the resolved images of AR tags (e.g., by averaging, weighted averaging, confidence values, use the "clearest" image of an AR tag alone, and so on) to arrive at an identified marker 208. The identified marker 208 may then be used by a basis computation module 210 to compute an optical basis 212 that describes a position or orientation of the part of the computing device 102. This optical basis 212 may then be used for a variety of purposes, such as to generate an augmented-reality display as previously described.

In this way, the color channel techniques described herein may overcome a variety of drawbacks encountered using traditional techniques. For example, traditional techniques previously had limited range due to limitations of a resolution of a camera used to capture an image of AR tags. Because AR tagging traditionally depended upon identifying markers of a fixed sized, an operation range of distances between the traditional AR tag and the camera was limited by this combination. For instance, the combination may fail once a camera moves beyond the range that resolution of an image of the AR tag. An ability to resolve features of the AR tag, for instance, may be lost as the pixel resolution of the camera is no longer sufficient to resolve the feature.

Likewise, a traditional "large" AR tag may limit a minimum range at which the AR tag may be resolved as typically the image captured is to include a significant portion of the tag in order to be able to resolve the image. For instance, at a close range a camera may not be able to capture an image of a portion of the large AR tag that is sufficient to identify the tag to compute an optical basis.

In another example, traditional AR tags may be skipped if the AR tag cannot be classified by the computing device. This may introduce error and may result in a lack of determination of the optical basis if AR tags are not available for identification. In a further example, traditional AR tags could not overlap. Therefore, if a physical environment was relatively small but yet was to be viewed from micro and macro distances there may not be enough space in the environment using traditional techniques to include each type of AR tag to be used to support these different distances.

Using the color channel techniques described herein, however, separate channels may be used to capture images of optical markers having different scales, thereby increasing an effective range of distances between the camera and the markers. For example, an incoming RGB stream from the camera 116 may be separated into its constituent red, green, and blue channels 202, 204, 206 as shown. The channels may then be converted to grayscale and processed to identify the markers. Thus, different scales of markers may be encoded for different color channels. Further, based on a previous reference location the marker identification module 136 may estimate which image is most likely relevant, comparatively, for a given frame, thereby promoting sufficient pixel coverage.

As illustrated, a larger marker channel (e.g., the red color channel 202) may be used for relatively long distance registration of the camera's position or orientation. On the other hand, a smaller marker channel (e.g., the blue color channel 206) may be used for relatively short distance registration of the camera's 116 position or orientation. If the camera 116 approaches a large AR tag to closely, for instance, a field of view of the camera 116 may truncate regions of the large AR tag, which may prevent this image of the portion of the larger tag from being identified. Therefore, another color channel may be used to identify a corresponding AR tag (e.g., the green or blue color channels 204, 206) in such an instance.

In addition, the marker identification module 136 may leverage resolution of AR tags from multiple color channels. For example, the marker identification module 136 may be able to identify a plurality of AR tags included in respective ones of a plurality of color streams. These identified AR tags may then be used to arrive at a combined value, such as by taking a weighted sum, averaging of confidence values, and so forth. Through use of a plurality of different colors, AR tags 130 may also be combined to form a composite AR tag and thus may utilize a lesser amount of space yet still support a larger range of distances, further discussion of which may be found in relation to the following figure.

Figure 3:
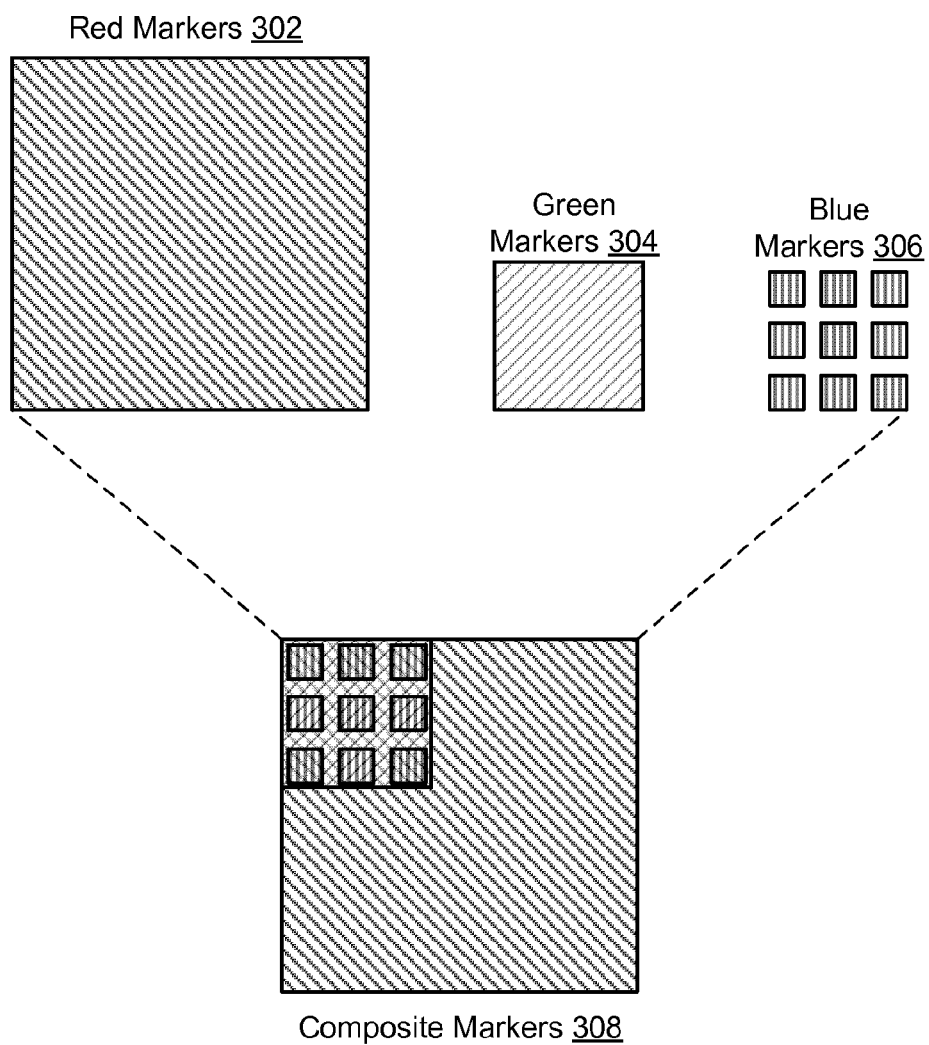
FIG. 3 depicts an apparatus in an example implementation showing a composite augmented reality (AR) tag formed from a plurality of AR tags having differing sizes and colors.

FIG. 3 depicts an apparatus 300 in an example implementation showing a composite AR tag formed from a plurality of AR tags having differing sizes and colors. In this example, three different size markers are illustrated that have different scales, red markers 302 having a relatively large scale, green markers 304 having a medium-sized scale, and blue markers 306 having a relatively small scale. Use of red by the red markers 302 is illustrated through use of forward hashing, use of green by the green markers 304 is illustrated through use of backward hashing, and use of blue by the blue markers 306 is illustrated through use of vertical hashing.

Through the use of the different colors, a composite marker 308 may be formed that includes the red, green, and blue markers 306. For example, portions of the composite marker 308 may include a single color, two colors, three colors, no colors, and so on. Thus, the colors may be overlaid such that different scales of marker may be supported by the composite marker 308. By separating the channels, each of these colors may then be resolved even if overlaid.

Although three colors were described in this example, it should be readily apparent that a variety of different numbers of colors and colors themselves may be utilized without departing from the spirit and scope thereof. Further, although AR tags were described in these examples, it should also be readily apparent that a variety of optical markers may be leveraged, such as objects that are typically found and identifiable in a physical environment as previously described in relation to FIG. 1.

Example Procedures

The following discussion describes augmented reality techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and the systems and apparatus 200, 300 of FIGS. 2 and 3, respectively.

Figure 4:
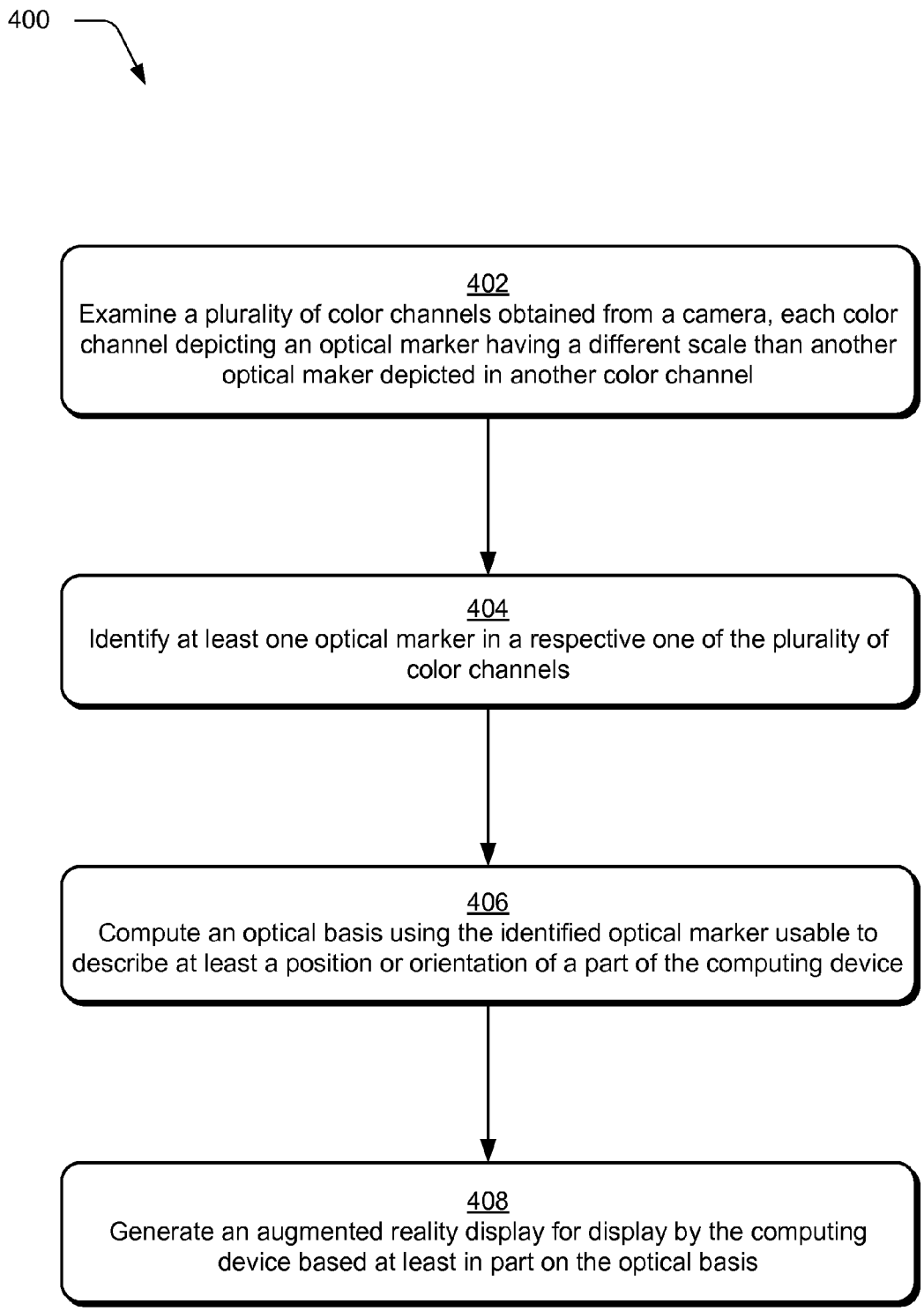
FIG. 4 is a flow diagram depicting a procedure in an example implementation in color channel techniques are utilized to compute an optical basis for at least part of a computing device.

FIG. 4 depicts a procedure 400 in an example implementation in which color channel techniques are utilized to compute an optical basis for at least part of a computing device. A plurality of color channels obtained from a camera is examined. Each of the color channels depict an optical marker having a different scale than another optical maker depicted in another one of the color channels (block 402). The camera 116, for instance, may capture an image of an AR tag 130, objects in a room 106 (which may be used an optical markers), and so on.

At least one of the optical markers is identified in a respective one of the plurality of color channels (block 404). The marker identification module 136, for instance, may examine images in the different color channels to determine if one or more of the images are sufficient to identify an optical marker.

An optical basis is computed using the identified optical marker usable to describe at least a position or orientation of a part of the computing device (block 406). The computation of the optical basis, for instance, may be based on a single optical marker identified in a single color channel, images taken from multiple channels, and may also involve interpolation using previous optical bases and/or images taken from color channels.

An augmented reality display is generated for display by the computing device based at least in part on the optical basis (block 408). The augmented-reality display, for instance, may be configured to include objected generated by the augmented-reality module 106 that are positioned in the display according to the optical basis.

Figure 5:
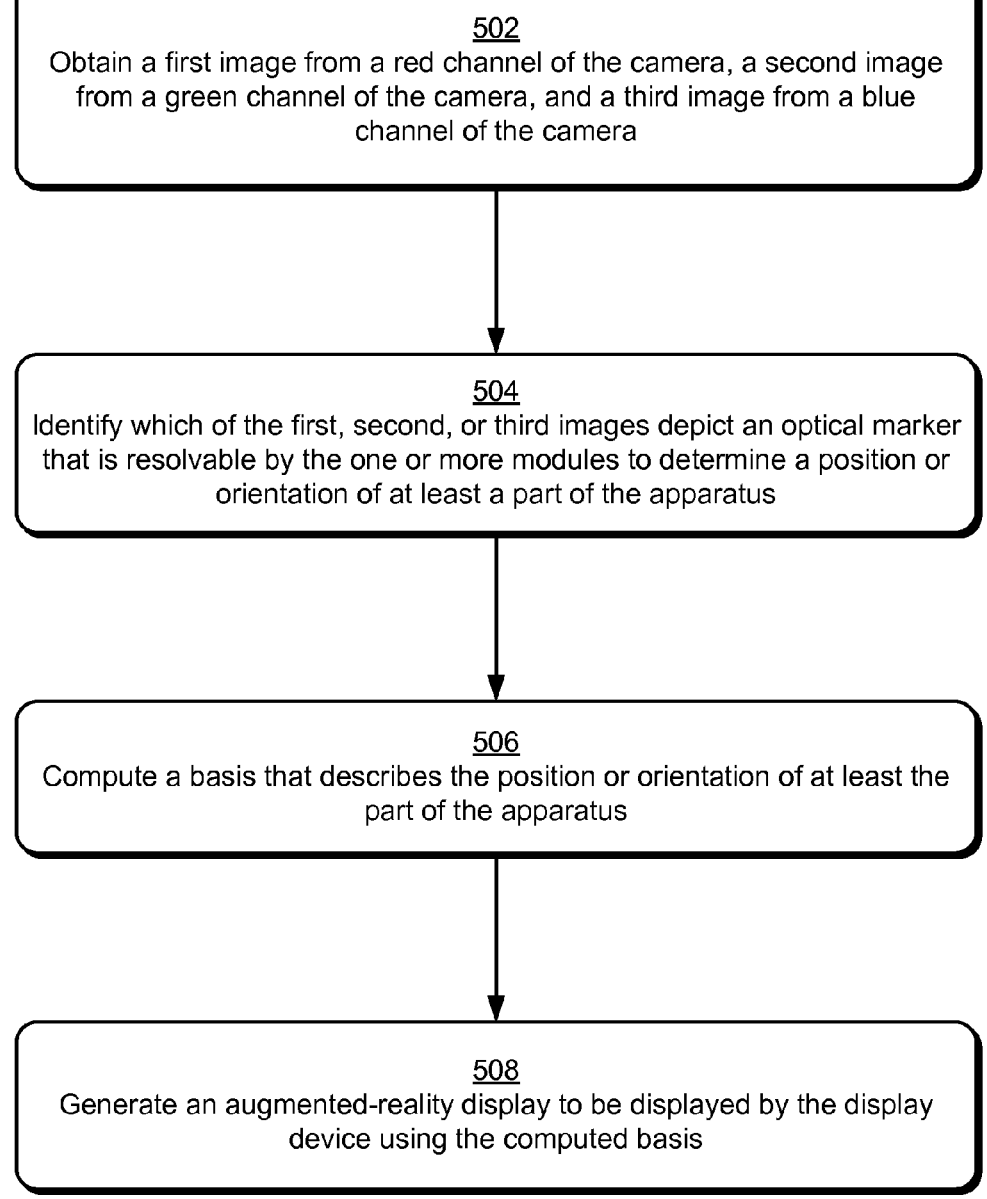
FIG. 5 is a flow diagram depicting a procedure in an example implementation in which an augmented reality display is generated based on resolution of optical markers from red, green, and blue color channels.

FIG. 5 depicts a procedure in an example implementation in which an augmented reality display is generated based on resolution of optical markers, from red, green, and blue color channels. A first image is obtained from a red channel of the camera, a second image is obtained from a green channel of the camera, and a third image is obtained from a blue channel of the camera (block 502). The camera 116, for instance, may include sensors that are configured to capture, red, green, and blue images and provide the images via separate color channels. In another example, a RGB feed may be separated into red, green, and blue channels by the computing device 102.

One or more modules are used to identify which of the first, second, or third images depict an optical marker that is resolvable by the one or more modules to determine a position or orientation of at least a part of an apparatus (block 504). As previously described, the images may be converted to grayscale and processed to determine if one or more of the images are resolvable to identify an optical marker, such as an AR tag.

A basis is computed that describes the position or orientation of at least the part of the apparatus (block 506). The basis, for instance, may be computed from a single image of an AR tag, average values from two of the images, a weighted average of the three color channels, and so forth. An augmented-reality display may then be generated to be displayed by the display device using the computed basis (block 508). As previously described, although red, green, and blue color channels were described, a variety of different color may be utilized without departing from the spirit and scope thereof.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by a computing device, the method comprising:
examining a plurality of color channels obtained from a camera, each said color channel depicting an optical marker having a different scale than another optical maker depicted in another said color channel, the different scales of the optical markers being resolvable at different distances from the camera;
identifying at least said optical marker in a respective one of the plurality of color channels by comparing resolved images of the optical markers to locate one or more optical tags; and
computing an optical basis for determining the position and/or orientation of said camera in a physical environment using the identified optical marker usable to describe the position and/or orientation of a part of the computing device.

2. A method as described in claim 1, wherein the plurality of color channels include a red color channel, a green color channel, and a blue color channel.

3. A method as described in claim 1, wherein the one or more optical tags of the optical markers are composite augmented reality tags that are resolvable at different distances from the camera.

4. A method as described in claim 1, further comprising separating the plurality of color channels into separate feeds to be used for the examining.

5. A method as described in claim 1, wherein the computing includes resolving a coordinate frame using a weighted output of confidence values computed using respective ones of the optical tags from the plurality of color channels.

6. A method as described in claim 1, wherein the identifying includes selecting the at least one said optical marker from images of the plurality of color channels that has a sufficient resolution to compute the optical basis.

7. A method as described in claim 1, wherein the optical markers are part of a composite optical marker that is formed from a plurality of different colors, each of the colors corresponding to a respective said color channel and resolvable to show a respective said optical marker in a respective said scale.

8. A method as described in claim 1, wherein the optical markers are configured as augmented reality tags.

9. A method as described in claim 1, wherein the part of the computing device is wearable by a user.

10. A method as described in claim 1, further comprising generating an augmented reality display for display by the computing device based at least in part on the optical basis.

11. A method as described in claim 1, wherein the one or more optical tags of the optical markers include:
a first optical tag that is resolvable at a first distance by the camera of the computing device and depicted using a first color; and
a second optical tag that is resolvable at a second distance at which the first optical tag is not resolvable by the camera of the computing device, the second optical tag depicted using a second color that is different than the first color.

12. An apparatus comprising:
a first optical tag that is resolvable at a first distance by a camera of a computing device and depicted using a first color;
a second optical tag that is resolvable at a second distance at which the first optical tag is not resolvable by the camera of the computing device, the second optical tag depicted using a second color that is different than the first color; and
the first and second optical tags form a composite optical tag that includes the first and second colors, the first distance being different than the second distance, and the first optical tag said resolvable at the first distance based on the first color, but not resolvable at the second distance, and the second optical tag said resolvable at the second distance based on the second color, but not resolvable at the first distance.

13. An apparatus as described in claim 12, wherein the first and second optical tags are overlaid, one with the other.

14. An apparatus as described in claim 12, further comprising a third optical tag that is resolvable at a third distance at which the first and second optical tags are not resolvable by the camera, the third optical tag depicted using a third color that is different than the first and second colors.

15. An apparatus as described in claim 14, wherein:
the first, second, and third colors are red, green, or blue; and
the optical tags form a composite augmented reality marker that includes the optical tags resolvable at the different distances.

16. An apparatus as described in claim 12, wherein the first optical tag is not resolvable by the camera of the computing device at the second distance due to a resolution of the camera.

17. An apparatus comprising:
a camera;
a display device; and
one or more modules that are configured to:
obtain a first image from a red channel of the camera, a second image from a green channel of the camera, and a third image from a blue channel of the camera;
identify which of the first, second, or third images depict an optical marker that is resolvable by the one or more modules to determine a position and/or orientation of at least a part of the apparatus, said first, second, and third images each including a respective optical marker, the respective optical markers being resolvable at different distances from the apparatus;
compute an optical basis that describes the position and/or orientation of said camera in a physical environment of the apparatus based on the optical marker that is resolvable at a current distance from the camera; and
generate an augmented-reality display to be displayed by the display device using the computed basis.

18. An apparatus as described in claim 17, wherein at least one of the first, second, or third images depicts an optical marker that is resolvable at a distance by the camera that is different than a distance at which another optical marker of a different one of the first, second, or third images.

19. An apparatus as described in claim 17, wherein the optical markers are part of a composite optical marker that is formed using red, green, and blue colors.

20. An apparatus as described in claim 19, wherein at least two of the colors that correspond to respective said optical markers are overlaid in at least a portion of the composite optical marker.

* * * * *